United States Patent
Rankin et al.

(10) Patent No.: US 6,813,665 B2
(45) Date of Patent: Nov. 2, 2004

(54) INTERRUPT METHOD, SYSTEM AND MEDIUM

(75) Inventors: Linda J. Rankin, Portland, OR (US); Stanley S. Kulick, Portland, OR (US); Michael Cekleov, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 09/962,720

(22) Filed: Sep. 21, 2001

(65) Prior Publication Data

US 2003/0061423 A1 Mar. 27, 2003

(51) Int. Cl.[7] .................................................. G06F 9/50
(52) U.S. Cl. ........................................ 710/260; 710/48
(58) Field of Search ........................ 710/48, 260, 262, 710/264, 266, 268

(56) References Cited

U.S. PATENT DOCUMENTS

| | | | |
|---|---|---|---|
| 3,665,404 A | * 5/1972 | Werner | 710/262 |
| 5,179,707 A | * 1/1993 | Piepho | 710/260 |
| 5,265,215 A | * 11/1993 | Fukuda et al. | 710/123 |
| 5,423,049 A | * 6/1995 | Kurihara | 710/262 |
| 5,481,725 A | 1/1996 | Jayakumar et al. | |
| 5,495,615 A | 2/1996 | Nizar et al. | |
| 5,511,200 A | 4/1996 | Jayakumar | |
| 5,619,705 A | 4/1997 | Karnik et al. | |
| 5,689,713 A | * 11/1997 | Normoyle et al. | 710/263 |
| 5,727,217 A | 3/1998 | Young | |
| 5,857,090 A | 1/1999 | Davis et al. | |
| 5,918,057 A | * 6/1999 | Chou et al. | 710/260 |
| 6,189,065 B1 | * 2/2001 | Arndt et al. | 710/260 |
| 6,219,741 B1 | 4/2001 | Pawlowski et al. | |

* cited by examiner

Primary Examiner—Glenn A. Auve
(74) Attorney, Agent, or Firm—Jeffrey B. Huter

(57) ABSTRACT

An interrupt method, system, and/or medium may comprise generating a load balancing value that helps balance servicing of interrupts among processors.

30 Claims, 7 Drawing Sheets

INTERRUPT METHOD, SYSTEM AND MEDIUM

BACKGROUND

Computing devices commonly include a processor and one or more devices that request the processor to perform actions in response to certain events. One technique for requesting service is for the requesting device to generate an interrupt signal in response to detecting an event to be serviced by the processor. The processor may detect the interrupt signal and in response to detecting the interrupt signal may execute an appropriate interrupt service routine for the interrupt.

Computing devices may include two or more processors and several devices requesting service from the processors. In such computing devices, if all interrupt signals are directed to a single processor that particular processor may be unable to service requests in a timely manner due to the sheer number of interrupts generated by the devices. Some balancing of interrupt servicing among the processors may enable more timely servicing of requests and may enable better overall performance.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

Figure 1:
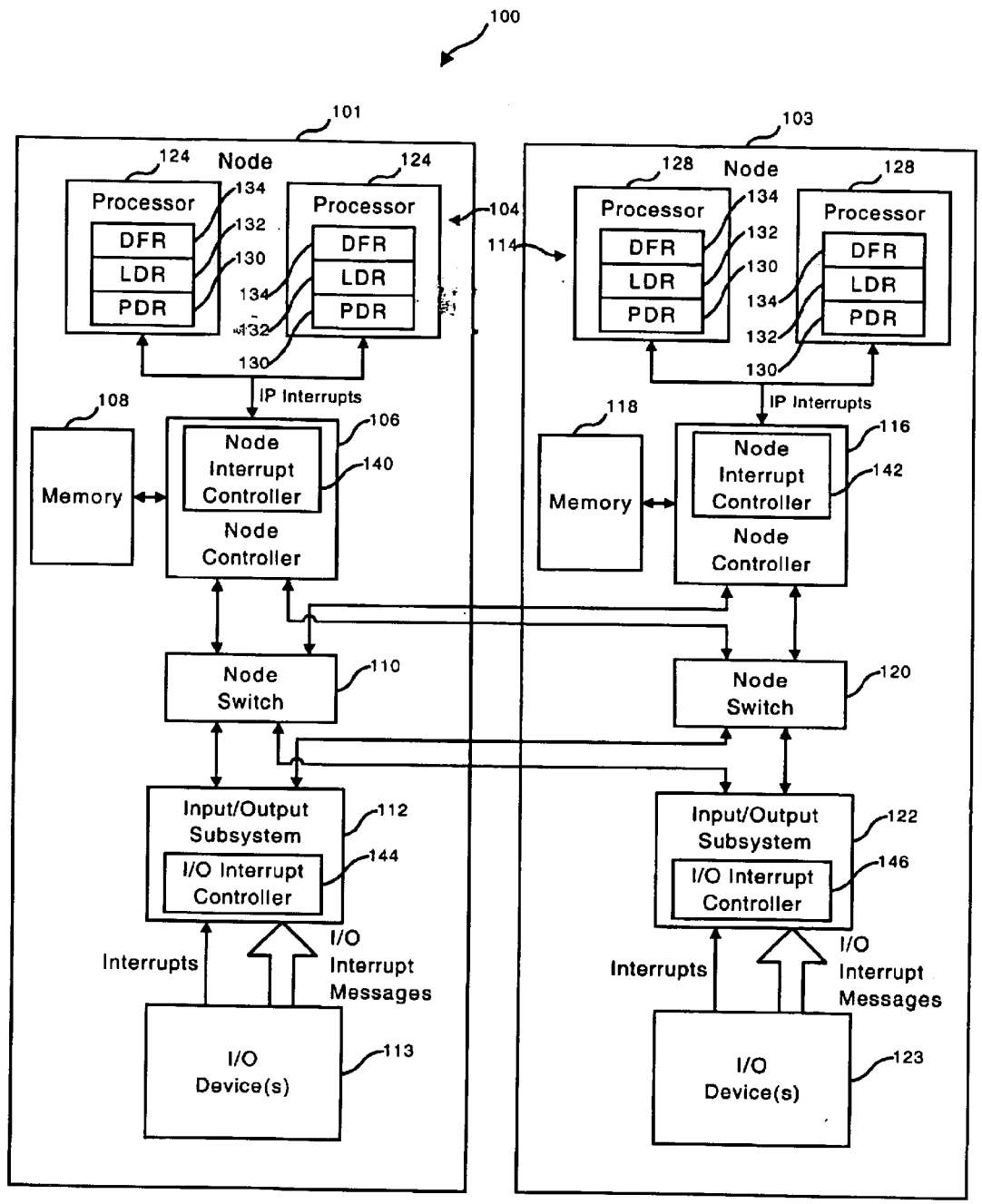
FIG. 1 is a simplified block diagram illustrating an example system.

In the following detailed description, numerous specific details are described in order to provide a thorough understanding of the invention. However, the present invention may be practiced without these specific details. In other instances, well-known methods, procedures, components and circuits have not been described in detail so as not to obscure the present invention. Further, example sizes/models/values/ranges may be given, although the present invention is not limited to these specific examples.

With regard to the description of any signals, the terms HIGH and LOW and the terms ASSERTED and DEASSERTED may be used in a generic sense to represent logical "1" and logical "0" respectively. More particularly, such terms may be used to avoid confusion when working with a mixture of "active-low" and "active-high" signals, and to represent the fact that the invention is not limited to the illustrated/described signals, but may be implemented with a total/partial reversal of any of the "active-low" and "active-high" signals by a change in logic. Additionally, well known power/ground connections to integrated circuits (ICs) and other components may not be shown within the figures for simplicity of illustration and discussion, and so as not to obscure the invention. Where specific details (e.g., circuits, flowcharts) are set forth in order to describe example embodiments of the invention, it should be apparent to one skilled in the art that the invention may be practiced without, or with variation of, these specific details. Finally, it should be apparent that different combinations of hard-wired circuitry may be used to implement embodiments of the present invention. That is, the present invention is not limited to any specific combination of hardware, software, and/or firmware.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some portions of the detailed description which follow are presented in terms of algorithms and symbolic representations of operations on data bits or binary digital signals within a memory. These algorithmic descriptions and representations may be the techniques used by those skilled in the data processing arts to convey the substance of their work to others skilled in the art.

An algorithm is herein, and generally, considered to be a self-consistent sequence of acts or operations leading to a desired result. These include physical manipulations of physical quantities. Usually, though not necessarily, these quantities take the form of electrical, magnetic, and/or optical signals capable of being stored, transferred, combined, compared, and/or otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Referring now to FIG. 1, an example system 100 may comprise a node 101 and another node 103. The node 101 may comprise a processor set 104, a node controller 106, a memory 108, a node switch 110, a input/output (I/O) subsystem 112, and one or more I/O devices 113. Similarly, the node 103 may comprise a processor set 114, a node controller 116, a memory 118, a node switch 120, a I/O subsystem 122, and one or more I/O devices 123.

As depicted, the processor set 104 comprises two processors 124 that are associated with the node controller 106 and the processor set 114 comprises two processors 128 that are associated with the node controller 116. However, the term "set" as used herein means a collection of zero or more objects. Accordingly, the processor set 104 may comprise zero, one, two, three, or more processors 124 that are associated with the node controller 106. Similarly, the processor set 114 may comprise zero, one, two, three, or more processors 128 that are associated with the node controller 116.

The processors 124, 128 may comprise a physical destination register (PDR) 130, a logical destination register (LDR) 132, and a destination format register (DFR) 134. The PDR 134 may store a physical identifier that may be used to physically address and/or otherwise identify the respective processor 124, 128. A processor 124, 128 may then determine that the processor 124, 128 is a target of a physically addressed interrupt message 300 (See, FIG. 3) in response to the processor 124, 128 determining that a destination field 308 of the interrupt message 300 matches the physical identifier of the respective processor 124, 128. Accordingly, if the PDR 130 in an example embodiment consists of eight bits (8) and one address is used as a broadcast address, then the system 100 may support up to two hundred fifty-five (255) interrupt targets in physical mode.

The LDR 132 may store a logical identifier that may be used to logically address and/or otherwise identify the respective processor 124, 128. The DFR 134 may store a logical mode value that indicates a logical addressing scheme used by the respective processor 124, 128 in interpreting the logical identifier of the LDR 132. In an example embodiment, the logical mode value of the DFR 134 indicates whether the processor 124, 128 is to interpret the logical identifier as a flat mode or a cluster mode identifier. In flat mode, each processor 124, 126 of the system 100 is assigned a logical identifier with a single asserted bit (e.g. a single bit at logical "1" and the remaining bits at logical "0") such that no two processors 124, 128 of the system 100 comprise a logical identifier with the same asserted bit. A processor 124, 128 in the example flat mode may then determine that the processor 124, 128 is a target of an interrupt message 300 in response to the interrupt message 300 comprising a destination field 308 comprising an asserted bit that corresponds to the asserted bit of LDR 132 of the processor 124, 128. Accordingly, if the LDR 132 in an example embodiment consists of eight (8) bits, then the system 100 may support up to eight (8) interrupt targets in flat mode.

In cluster mode, each processor 124, 128 of the system 100 is assigned a logical identifier comprising a cluster identifier and an agent identifier. The cluster identifier assigns the respective processor 124, 128 to a processor cluster that may comprise more than one processor 124, 128. Each processor 124, 128 of a processor cluster is assigned an agent identifier with a single asserted bit such that no two processors 124, 128 of the same processor cluster comprise an agent identifier with the same asserted bit. A processor 124, 128 in the example cluster mode may then determine that the processor 124, 128 is a target of a logically addressed interrupt message 300 in response to the interrupt message 300 comprising a destination field 308 comprising a cluster identifier that matches the cluster identifier of the processor 124, 128 and an asserted bit that corresponds to the asserted bit of the agent identifier of the processor 124, 128. Accordingly, if the system 100 in an example embodiment defines the cluster identifier as consisting of four (4) bits and the agent identifier as consisting of four (4) bits, then the system 100 may support up to sixteen (16) processor clusters with each processor cluster comprising up to four (4) interrupt targets in cluster mode.

The physical mode, flat mode, and cluster mode addressing schemes are merely illustrative. For example, features of the invention may be utilized with a subset of the above described addressing schemes and/or other addressing schemes.

The node controllers 106, 116 may comprise memory controllers (not shown) to provide processors 124, 128 with access to associated memory 108, 118. The node controllers 106, 116 may further comprise node interrupt controllers 140, 142. The node interrupt controllers 140, 142 may manage inter-processor interrupts generated by processors 124, 128 and I/O interrupts generated by devices other than the processors 124, 128 such as, for example, I/O devices 113, 123 that are coupled to I/O subsystems 112, 122. In an example embodiment, the node interrupt controllers 140, 142 may receive interrupt messages 300 in response to generated inter-processor and/or I/O interrupts and cause processors 124, 128 to service inter-processor and/or I/O interrupts associated with the received interrupt messages 300 based upon load balancing values of the received interrupt messages 300. Further, the node interrupt controllers 140, 142 may provide inter-processor interrupt messages 300 with load balancing values that help to balance servicing of inter-processor interrupts among processors 124, 128.

The node switches 110, 120 may couple the node 101 to the node 103 to enable processors 124 of the processor set 104 to access resources of the node 103 such as, for example, the memory 118 and/or I/O devices 123 coupled to the I/O subsystem 122 and to enable processors 128 of the processor set 114 to access resources of the node 101 such as, for example, the memory 108 and/or I/O devices 113 coupled to the I/O subsystem 112.

The I/O subsystems 112, 122 may each comprise one or more I/O hubs, bridges and/or interfaces (not shown) to support data transfers with I/O devices 113, 123 coupled to the I/O subsystems 112, 123 via one or more I/O buses such as, for example, Industry Standard Architecture (ISA) buses, Peripheral Component Interconnect (PCI) buses, High Speed Interconnect (HSI) buses, Universal Serial Bus (USB) buses, Advanced Technology Attachment (ATA) buses, Small Computer System Interface (SCSI) buses, InfiniBand buses, etc. The I/O subsystems 112, 122 may further comprise I/O interrupt controllers 144, 146 portions of which may be distributed among one or more components of the I/O subsystems 112, 122. The I/O interrupt controllers 144, 146 may receive interrupt signals and/or interrupt messages 300 from the I/O devices 113, 123. In an example embodiment, the I/O interrupt controllers 144, 146 may provide the node controllers 106, 116 with interrupt messages 300 in response to the interrupt signals and/or interrupt messages 300 received from the I/O devices 113, 123. The I/O interrupt controllers 144, 146 of an example embodiment provide an interrupt message 300 that comprises a destination identifier that identifies a target processor set to service the interrupt, a load balancing value that helps balance servicing of interrupts among the processors 124, 128, and an interrupt service routine (ISR) vector that identifies an interrupt service routine to service the interrupt (See, FIG. 3).

Figure 2:
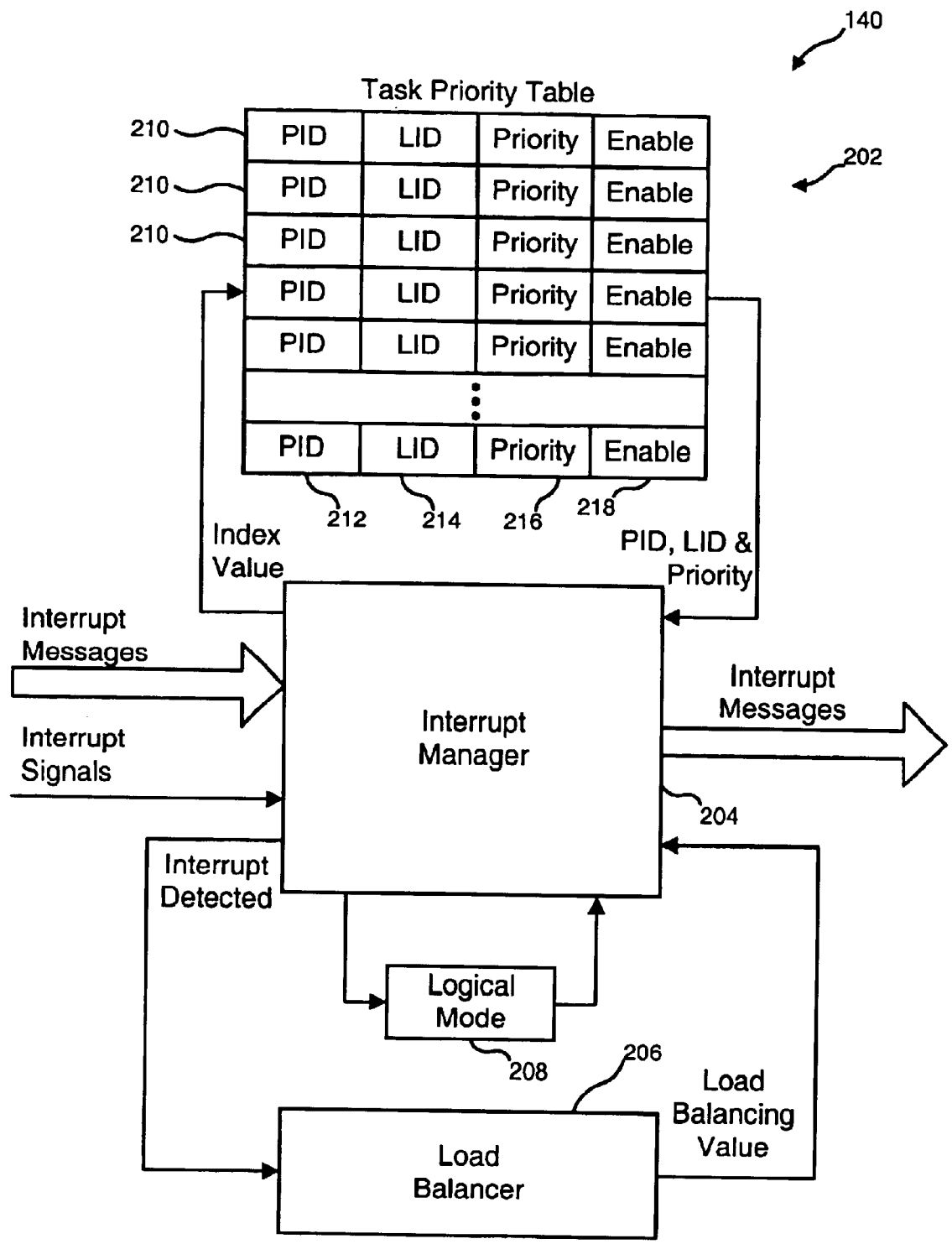
FIG. 2 is a simplified block diagram illustrating an example node interrupt controller of the example system of FIG. 1.

Referring now to FIG. 2, a block diagram of an example node interrupt controller 140 is shown. Other node interrupt controllers of the system 100 such as, for example, the node interrupt controller 142 of the node 103 may be implemented in a similar manner. The node interrupt controller 140 may comprise a task priority register (TPR) table 202, an interrupt manager 204, a load balancer 206, and a logical mode storage element 208. The TPR table 202 may comprise storage elements 210 such as, for example, registers, buffers, latches, and/or flip-flops. Each storage element 210 may be associated with a processor 124 of the node 101 and may store information associated with a respective processor 124. Similarly, the node interrupt controller 142 of the node 103 may comprise a TPR table comprising storage elements associated with the processors 128.

In an example embodiment, the storage element 210 may comprise a physical identifier field 212, a logical identifier field 214, a task priority field 216, and an enable field 218 to respectively store a physical identifier, a logical identifier, a task priority value, and an enable indicator for an associated processor 124. The physical identifier provides an identifier for physically addressing the processor 124 associated with the storage element 210, the logical identifier provides an identifier for logically addressing the processor 124 associated with the storage element 210, the task priority value provides an indication of a priority level associated with a task being processed by the associated processor 124, and the enable indicator provides an indication as to whether the associated processor 124 is enabled for servicing interrupts. In an example embodiment, the interrupt manager 204 may provide the TPR table 202 with an index value in order to obtain the physical identifier, the logical identifier, the task priority value, and the enable indicator from a storage element 210 associated with the index value.

The load balancer 206 may generate a load balancing value in response to the node interrupt controller 140 detecting an interrupt. The load balancer 206 may generate the load balancing value based upon a predetermined algorithm. In an example embodiment, the load balancer 206 may comprise a counter such as, for example, a four bit wrap-around counter that may update the load balancing value based upon the predetermined algorithm and provide the updated value to the interrupt manager 204.

The interrupt manager 204 may detect inter-processor interrupts in response to receiving inter-processor interrupt messages 300 from processors 124. In response to detecting an inter-processor interrupt, the interrupt manager 204 may further provide interrupt messages 300 to the node controller 116 of the node 103 via the node switch 110. The interrupt manager 204 may generate an interrupt message 300 based upon information from the processor 124 that originated the interrupt and the load balancing value provided by the load balancer 206. Further, interrupt manager 204 may provide the interrupt message 300 in serial or in parallel, and/or in one or more phases or transactions.

Further, in response to detecting an inter-processor interrupt or an I/O interrupt, the interrupt manager 204 may determine based upon a load balancing value associate with the interrupt whether its processor set 104, 114 is to process the interrupt. In response to determining that its processor set 104, 114 is to process the interrupt, the interrupt manager 204 may provide its respective processor set 104, 114 with an interrupt message for the detected interrupt.

The logical mode storage element 208 may comprise registers, buffers, latches, flip-flops, and/or other storage mechanisms. The logical mode storage element 208 may store a logical mode value that indicates whether the interrupt manager 204 is to interpret a logical mode identifier as a cluster mode identifier or as a flat mode identifier. In an example embodiment, each node interrupt controller 140, 142 comprises a logical mode storage element and the logical mode storage elements are configured such that the node interrupt controllers 140, 142 interpret logical mode identifiers as cluster mode identifiers or flat mode identifiers. In such an embodiment, the system 100 may be configured to use either cluster mode logical interrupts or flat mode logical interrupts but not both at the same time. However, the system 100 may alternatively be implemented to support simultaneous use of both cluster mode logical interrupts and flat mode logical interrupts.

Figure 3:
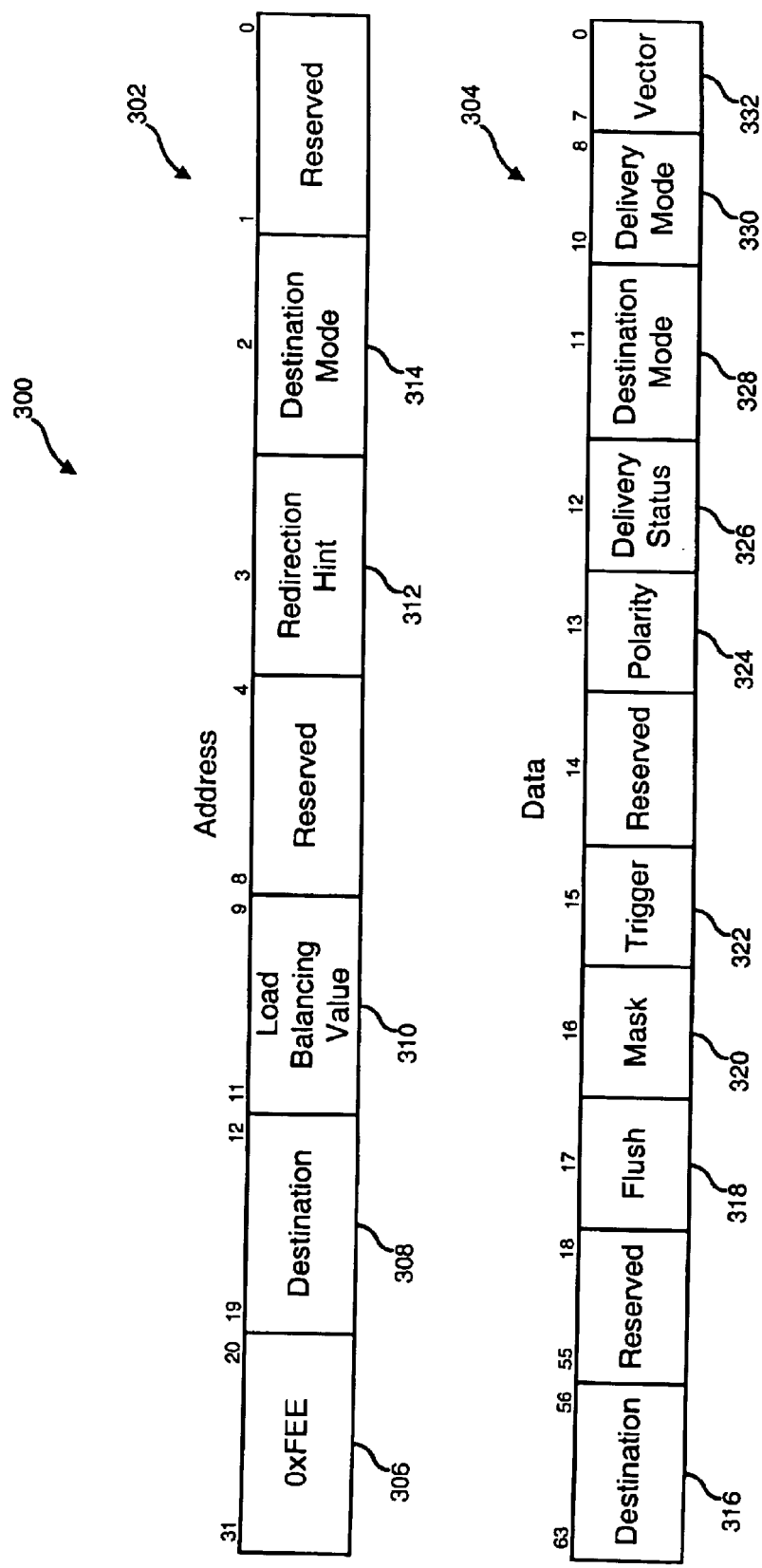
FIG. 3 illustrates an example interrupt message format utilized by the example system of FIG. 1.

An example interrupt message 300 of the system 100 is illustrated in FIG. 3. As illustrated, the example interrupt message 300 may comprise an address portion 302 and a data portion 304. The address portion 302 may comprise a preamble field 306, a destination field 308, a load balancing value field 310, a redirection hint field 312, and a destination mode field 314. The data portion 304 may comprise a destination field 316, a buffer flush field 318, a mask field 320, a trigger field 322, a polarity field 324, a delivery status field 326, a destination mode field 328, a delivery mode field 330, and an ISR vector field 332.

The interrupt message 300 of FIG. 3, however, is merely example and the system 100 may be implemented to generate interrupt messages 300 comprising all the depicted fields, a subset of the depicted fields, and/or fields other than the depicted fields. Moreover, the system 100 may be implemented to generate interrupt messages 300 with a different arrangement of fields, a different message length, and/or different field lengths.

Figure 4:
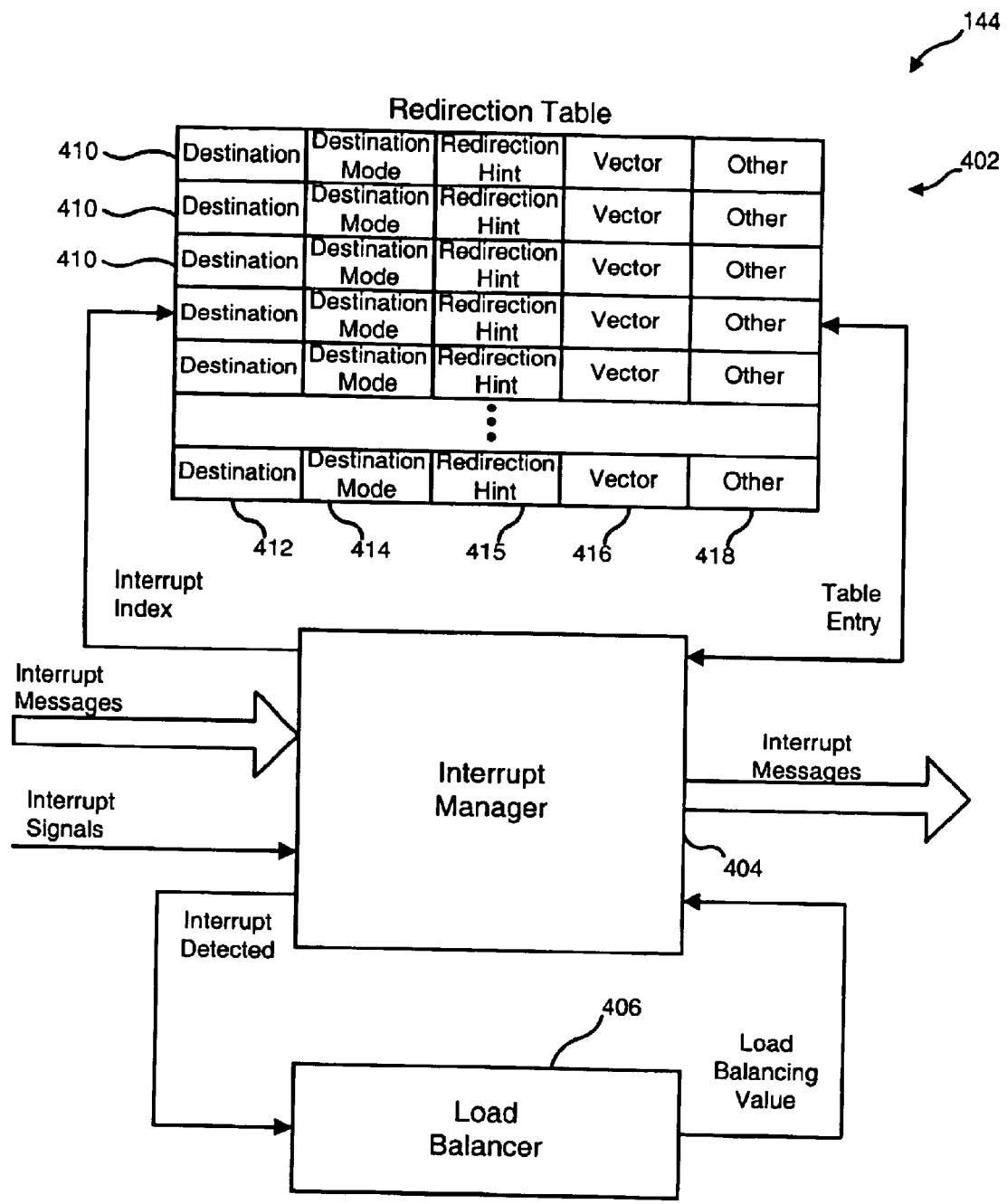
FIG. 4 is a simplified block diagram illustrating an example I/O interrupt controller of the example system of FIG. 1.

Referring now to FIG. 4, a block diagram of an example I/O interrupt controller 144 is shown. Other I/O interrupt controllers of the system 100 such as, for example, the I/O interrupt controller 146 of the node 103 may be implemented in a similar manner. The I/O interrupt controller 144 may comprise a redirection table 402, an interrupt manager 404, and a load balancer 406. The redirection table 402 may comprise storage elements 410 such as, for example, registers, buffers, latches, and/or flip-flops. Each storage element 410 may be associated with an interrupt and may store information that defines characteristics about the associated interrupt and/or servicing of the associated interrupt.

In an example embodiment, the storage element 410 may comprise a destination field 412, a destination mode field 414, a redirection hint field 415, an ISR vector 416 field, and/or other information fields 418 to respectively store a destination identifier, a destination mode, a redirection hint, an ISR vector, and/or other information such as, for example, a delivery mode, a delivery status, a trigger mode, an interrupt mask, a buffer flush enable, and/or an interrupt pin polarity. The destination identifier of the destination field 412 identifies a target processor set comprising zero or more processors 124, 128 that may service the interrupt associated with the storage element 410, and the destination mode of the destination mode field 414 identifies a destination addressing scheme for interpreting the destination identifier such as, for example, physical mode and logical mode. The redirection hint of the redirection hint field 415 provides an indication as to whether the interrupt may be redirected, and the ISR vector of the ISR vector field 416 identifies an interrupt service routine to be executed in response to servicing the associated interrupt.

The load balancer 406 may generate a load balancing value in response to the interrupt manager 404 detecting an interrupt. The load balancer 406 may generate the load balancing value based upon a predetermined algorithm. In an example embodiment, the load balancer 406 may comprise a counter such as, for example, a four bit wrap-around counter that may update the load balancing value based upon the predetermined algorithm and provide the updated value to the interrupt manager 404.

The interrupt manager 404 may detect interrupts in response to interrupt signals and/or interrupt messages 300 caused by I/O devices 113 that are associated with the I/O subsystem 112. For example, the interrupt manager 404 may receive signals via interrupt lines and may determine whether received signals are indicative of interrupts based upon information stored in the storage elements 410 associated with the interrupt lines. The information stored in the storage elements 410, for example, may define interrupts received via a first interrupt line as edge triggered; interrupts received via a second interrupt line as active high, level triggered; interrupts received via a third interrupt line as active low, level triggered; and interrupts received via a fourth interrupt line as masked or disabled.

The interrupt manager 404 may further provide interrupt messages 300 to node controllers 106, 116 via node switches 110 in response to detecting an interrupt. The interrupt manager 404 may generate an interrupt message 300 based upon information stored in the storage element 410 associated with the detected interrupt and the load balancing value provided by the load balancer 406. Further, the interrupt manager 404 may provide the interrupt message 300 in serial or in parallel, and/or in one or more phases or transactions.

As indicated above, portions of the I/O interrupt controller 144 may be distributed among one or more components of the I/O subsystem 112. For example, in one embodiment, the I/O subsystem 112 comprises an I/O hub coupled to the node switch 110 and a PCI to I/O hub bridge coupled to the I/O hub. In this embodiment, the PCI to I/O hub bridge receives interrupt signals and/or interrupt messages from associated PCI devices and provides the I/O hub with interrupt messages that include information from a redirection table 402 of the PCI to I/O hub bridge. Further, the I/O hub in this embodiment receives interrupt messages from the PCI to I/O bridge and provides the node switch 110 with interrupt messages comprising a load balancing value provided by a load balancer 406 of the I/O hub.

Figure 5:
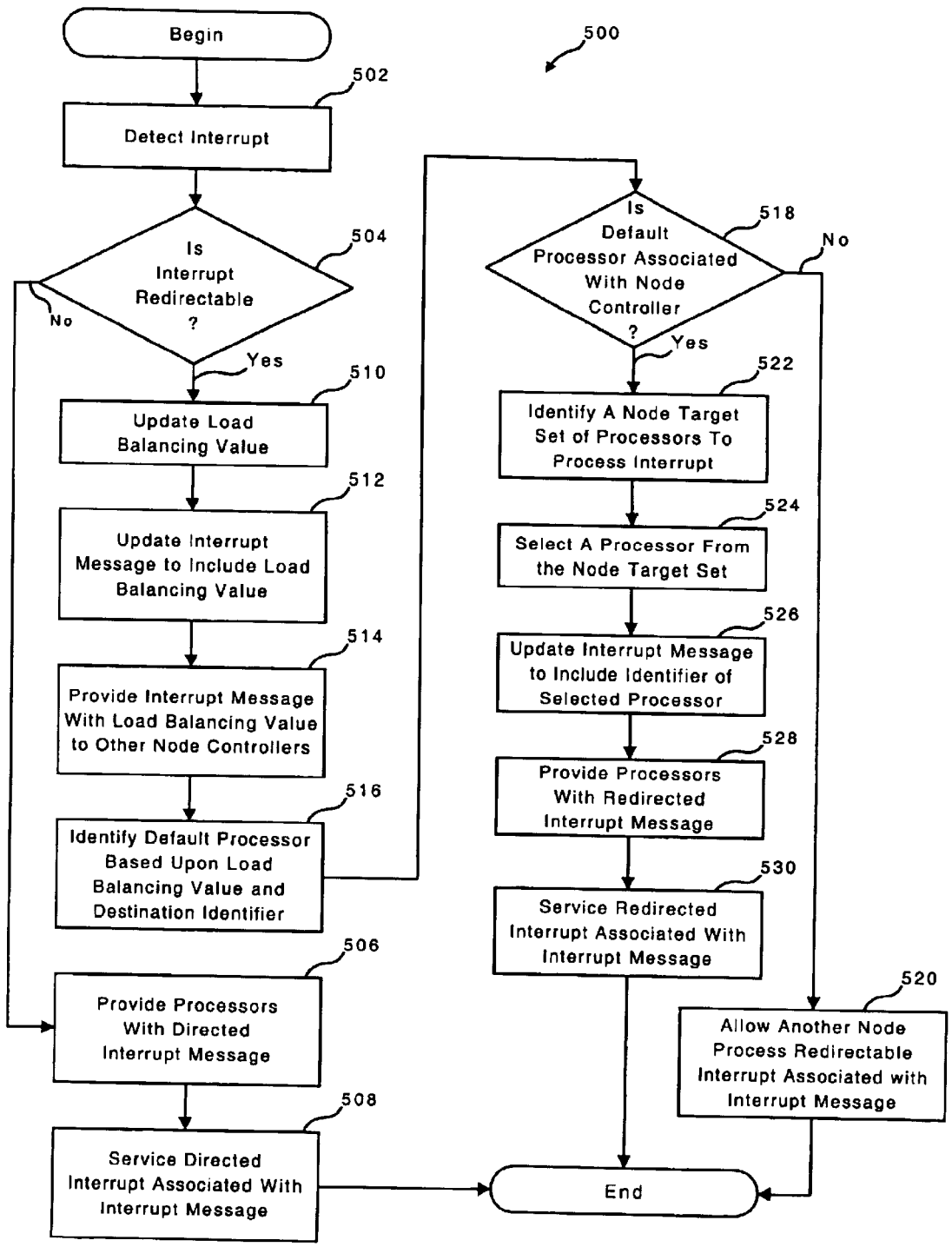
FIG. 5 is a flowchart illustrating an example interrupt processing method of the example system of FIG. 1.

Referring now to FIG. 5, there is depicted an example method 500 that may be used by the example system 100 to service inter-processor interrupts. The method 500 will be described primarily from the standpoint of the node interrupt controller 140 processing an inter-processor interrupt originating from a processor 124 associated with the node controller 106. However, it should be appreciated that the method 500 is also applicable to other node controllers of the system 100 servicing interrupts originating from associated processors. Further, the system 100 may perform all or a subset of the method 500 in response to executing instructions of a machine readable medium such as, for example, one or more read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while method 500 illustrates operation of the system 100 as a sequence of operations, the system 100 may perform various operations in parallel or in a different order.

Referring now to block 502, the interrupt manager 204 may detect an interrupt originating from a processor 124 in response to the processor 124 writing an interrupt message 300 for an inter-processor interrupt to one or more registers of the node controller 106. The interrupt manager 204 may determine in block 504 whether the detected interrupt may be redirected. In an example embodiment, the interrupt manager 204 may determine that the interrupt may be redirected based upon a redirection hint field 312 of the received interrupt message 300.

In response to the determining that the interrupt is directed, the interrupt manager 204 in block 506 may provide the directed interrupt message 300 to the processors 124, 128 for servicing. For example, in response to receiving a directed interrupt message 300 from a processor 124 associated with the node controller 106, the interrupt manager 204 in an example embodiment may provide the directed interrupt message 300 to the other node controller 116 via the node switch 110 for delivery to the processors 128 associated with the node controller 116. In an example embodiment, the interrupt manager 204 may not provide the directed interrupt message 300 to the processors 124 since the processors 124 also receive the interrupt message 300 in response to the interrupt message 300 being delivered to the node controller 106 via a processor bus shared by the processors 124. Accordingly, each processor 124, 128 of the system 100 may receive the interrupt message 300 for the directed interrupt.

In response to receiving the interrupt message 300, one or more processors 124, 128 may service in block 508 the directed interrupt associated with the interrupt message 300. In an example embodiment, each processor 124, 128 may determine based upon the values of the destination field 308 and the destination mode field 314 of the received interrupt message 300 that the processor 124, 128 is to execute the interrupt service routine identified by the ISR vector field 332 of the received interrupt message 300. For example, a processor 124, 128 may execute the interrupt service routine identified by the ISR vector field 332 in response to determining that the physical identifier of the destination field 308 matches the physical identifier of the processor's PDR 130. Similarly, a processor 124, 128 may execute the interrupt service routine identified by the ISR vector field 332 in response to determining that the logical identifier of the destination field 308 matches, in accordance with the logical mode value of the processor's DFR 134, the logical identifier of the processor's LDR 132.

In response to the interrupt manager 204 determining that the interrupt may be redirected, the load balancer 206 in block 510 may update a load balancing value. For example, the load balancer 206 may increment a load balancing value in response to the interrupt manager 204 detecting a redirectable interrupt originating from a processor 124.

In block 512, the interrupt manager 204 may update the redirectable interrupt message 300 to include the load balancing value. Further, the interrupt manager 204 may provide in block 514 the interrupt message 300 comprising the load balancing value to the other node controllers of the system 100 via the node switch 110.

The interrupt manager 204 may identify in block 516 a default processor for servicing the redirectable interrupt. In an example embodiment, if the interrupt message 300 is associated with a physical mode interrupt, the processor 124 that originated the interrupt may provide the destination field 308 of the interrupt message 300 with a physical identifier that physically identifies a processor 124, 128 of the system 100. For physical mode interrupts, the interrupt manager 204 in an example embodiment may select the processor 124, 128 identified by the physical identifier of the interrupt message 300 as the default processor.

In an example embodiment, if the interrupt message 300 is associated with a logical mode interrupt, the processor 124 that originated the interrupt may provide the destination field 308 of the interrupt message 300 with a destination identifier that logically identifies a target processor set comprising zero or more processors 124, 128 that may service the logical mode interrupt. The interrupt manager 204 may select one processor from the target processor set as the default processor based upon the load balancing value of the interrupt message 300 and a load balancing algorithm.

Figure 6:
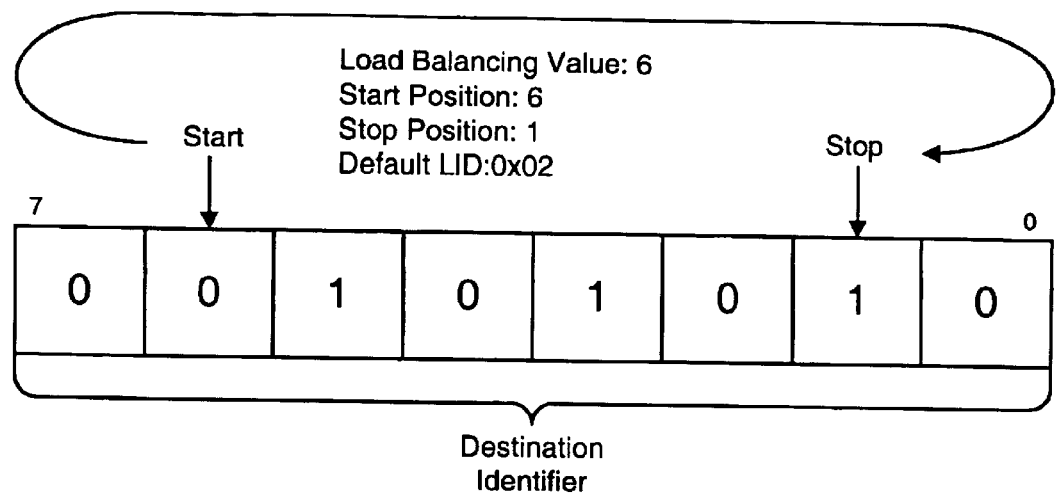
FIG. 6 illustrates an example process utilized by the example system of FIG. 1 to select a default processor from a target processor set.
Figure 6:
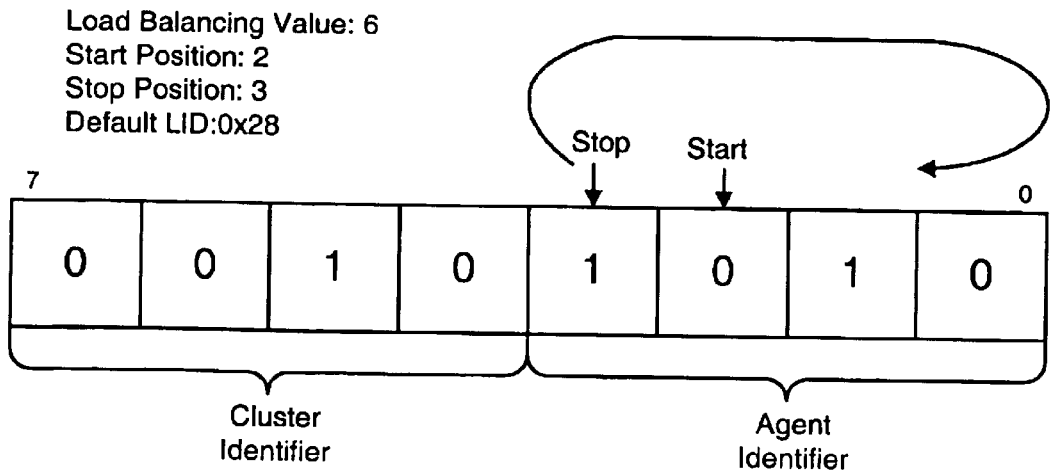

In an example embodiment, the load balancing value comprises a three bit value that provides a starting location for a first find algorithm applied to the destination identifier of the destination field 308. The destination identifier in flat mode may comprise eight bits in which each asserted bit of the destination identifier corresponds to a processor 124, 128 that may service the interrupt. The interrupt manager 204 of an example embodiment may start at a bit position of the destination identifier associated with the load balancing value and may perform a wrap-around search to locate the first asserted bit of the destination identifier as illustrated in FIG. 6. The interrupt manager 204 may then select the processor 124, 128 associated with the first found, asserted bit of the destination identifier.

Similarly, the destination identifier in cluster mode may comprise a cluster identifier of four bits and an agent identifier of four bits in which each asserted bit of the agent identifier corresponds to a processor 124, 128 of the cluster identified by the cluster identifier that may service the interrupt. The interrupt manager 204 of an example embodiment may start at a bit position of the destination identifier associated with the load balancing value and may perform a wrap-around search to locate the first asserted bit of the agent identifier as illustrated in FIG. 6. The interrupt manager 204 may then select the processor 124, 128 associated with the first found asserted bit of the destination identifier. The interrupt manager 204 may utilize a mapping function to map the eight values of the example load balancing value to the four bit locations of the example agent identifier. For example, in an example embodiment the interrupt manager 204 applies the modulus four function to the load balancing value to obtain the remainder of the load balancing value divided by four, thus mapping the load balancing values to the agent bit positions.

The interrupt manager 204 in block 518 may determine whether the identified default processor is associated with the node controller 106. The interrupt manager 204 in example embodiment may determine that the default processor is associated with the node controller 106 based upon information stored in the task priority table 202. More specially, the interrupt manager 204 of an example embodiment determines that the default processor is associated with its respective node controller 106 in response to determining that the task priority table 202 comprises an enabled storage element 210 comprising the physical identifier of the default processor in the case of a physical interrupt or the logical identifier of the default processor in the case of a logical interrupt.

In response to determining that the default processor is not associated with the node controller 106 of the node 101, the interrupt manager 204 may determine that the interrupt is to be processed by a processor of another node that is not associated with the node controller 106. Accordingly, the interrupt manager 204 of the node controller 106 in block 520 may terminate processing of the interrupt, thus allowing processors associated with another interrupt controller to service the interrupt.

In an example embodiment, each of the node controllers 106, 116 utilizes the same process to identify a default processor, thus each of the node controllers 106, 116 identifies the same default processor in response to processing a particular interrupt. Moreover, the default processor in an example embodiment is associated with only one of the node controllers 106, 116 and the associated node controller 106, 116 comprises an enabled storage element 210 comprising the physical identifier of the default processor in the case of a physical mode interrupt and/or the logical identifier of the default processor in the case of a logical mode interrupt. Accordingly, one of the node controllers 106, 116 of an example system 100 causes at least one of their associated processors 124, 128 to service the interrupt.

In response to determining that the default processor is associated with the node controller 106 of the node 101, the interrupt manager 204 may identify in block 522 a node target processor set comprising zero or more processors 124 that may service the interrupt. In an example embodiment, the interrupt manager 204 may determine based upon the enable fields 218 of the task priority table 202 which processors 124 are enabled for interrupt servicing, and the interrupt manager 204 may define the node target set as the enabled processors 124 of the node 101. Similarly, the interrupt manager 204 may determine based upon the enable fields 218 and the logical identifier fields 214 of the task priority table 202 which processors 124 identified by the destination identifier are enabled for interrupt servicing, and the interrupt manager 204 may define the node target set as the enabled processors 124 identified by the destination identifier.

The interrupt manager 204 in block 524 may select from the node target set, a processor 124 to service the interrupt. In an example embodiment, the interrupt manager 204 may select the least priority processor to service the interrupt; however, the interrupt manager 204 may alternatively utilize different selection techniques. In an example embodiment, the interrupt manager 204 determines based upon the task priority values of the task priority fields 216 associated with the processors 124 of the node target set which processor 124 of the node target set is associated with the least priority task. In response to determining that more than one processor 124 of the node target set is associated with the least priority, the interrupt manager 204 in an example embodiment may select the processor 124 associated with the storage element 210 having the lowest index value. However, the interrupt manager 204 may be implemented to utilize other tie breaking criteria such as, for example, selecting the default processor identified in block 516.

The interrupt manager 204 in block 526 may update the destination field 308 of the interrupt message 300 with the identifier of the processor 124 selected in block 524. In response to processing a logical mode interrupt, the interrupt manager 204 of an example embodiment may obtain the logical identifier for the selected processor 124 from the logical identifier field 214 associated with the selected processor 124 and may update the destination field 308 with the obtained logical identifier. Similarly, in response to processing a physical mode interrupt, the interrupt manager 204 of an example embodiment may obtain the physical identifier for the selected processor 124 from the physical identifier field 212 associated with the selected processor 124 and may update the destination field 308 with the obtained physical identifier.

In block 528, the interrupt manager 204 may provide the processors 124 of the node 101 with the updated interrupt message 300. In response to receiving the interrupt message 300, the selected processor 124 may service in block 530 the redirectable interrupt associated with the interrupt message 300. In an example embodiment, the processor 124 may determine based upon the values of the destination field 308 and the destination mode field 314 of the received interrupt message 300 that the processor 124 is to execute the interrupt service routine identified by the ISR vector field 332 of the received interrupt message 300. For example, the selected processor 124 may execute the interrupt service routine identified by the ISR vector field 332 in response to determining that the physical identifier of the destination field 308 matches the physical identifier of the processor's PDR 130. Similarly, the selected processors 124 may execute the interrupt service routine identified by the ISR vector field 332 in response to determining that the logical identifier of the destination field 308 matches, in accordance with the format value of the processor's DFR 134, the logical identifier of the processor's LDR 132.

Figure 7:
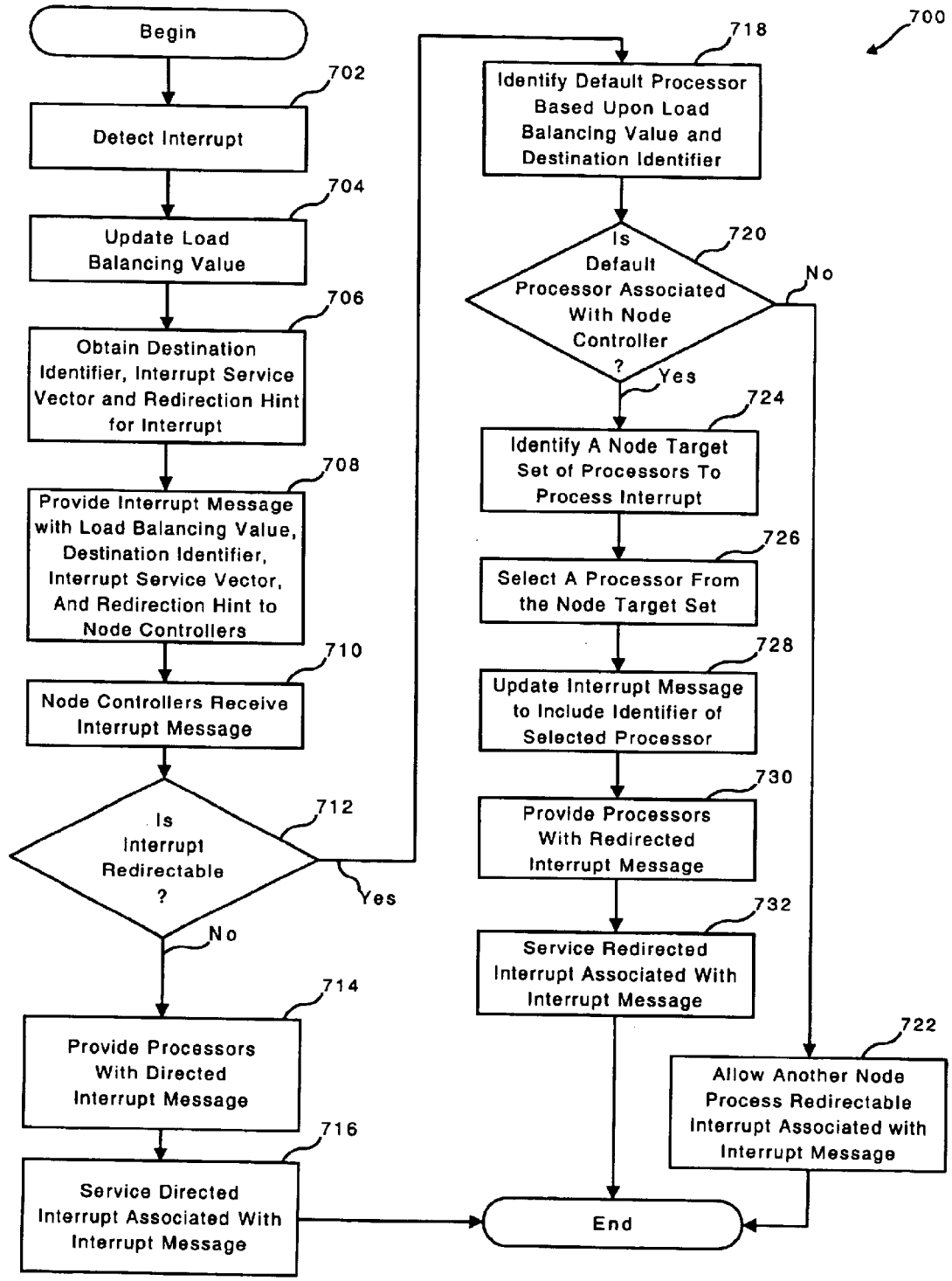
FIG. 7 is a flowchart illustrating another example interrupt processing method of the example system of FIG. 1.

FIG. 7 depicts an example method 700 that may be used by the example system 100 to service I/O interrupts. The method 700 will be described primarily from the standpoint of processing an I/O interrupt originating from an I/O device 113 coupled to the I/O subsystem 112. However, the method 700 is also applicable to processing an I/O interrupt originating from an I/O device coupled to another I/O subsystem such as, for example, an I/O device 123 coupled to the I/O subsystem 122. Further, the system 100 may perform all or a subset of the method 700 in response to executing instructions of a machine readable medium. Furthermore, while method 700 illustrates operation of the system 100 as a sequence of operations, the system 100 may perform various operations in parallel or in a different order.

Referring now to block 702, the interrupt manager 404 may detect an interrupt originating from an I/O device 113 in response to the I/O device 113 writing an interrupt message 300 to one or more registers of the I/O subsystem 112 and/or the I/O device 113 asserting an interrupt signal received by the I/O subsystem 112.

In response to the interrupt manager 404 detecting an interrupt, the load balancer 406 in block 704 may update a load balancing value. The interrupt manager 404 may obtain for the detected interrupt a destination identifier that identifies a target processor set comprising zero or more processors 124, 128, an ISR identifier, a redirection hint as well as other information from the storage element 410 of the redirection table 402 associated with the detected interrupt (block 706). Further, the interrupt manager 404 may provide in block 708 an interrupt message 300 comprising the destination identifier, the ISR identifier, the redirection hint, the load balancing value as well as other information to the node controllers 106, 116 via node switch 110.

The node controllers 106, 116 may receive in block 710 the interrupt message 300 from the interrupt manager 404 of the I/O subsystem 112. The node controllers 106, 116 may determine in block 712 based upon the redirection hint field 312 of the received interrupt message 300 whether the interrupt associated with the interrupt message 300 may be redirected. In response to determining that the interrupt is directed, the node controllers 106, 116 in block 714 provide the directed interrupt message 300 to their respective processors 124, 128 for servicing. One or more processors 124, 128 may then determine in block 716 to service the directed interrupt associated with the interrupt message 300 based upon the identifier of the destination field 308 of the received interrupt message 300.

In response to the node controllers 106, 116 determining that the interrupt is redirectable, the node controllers 106, 116 may identify in block 718 a default processor 124, 128 of the target processor set for servicing the redirectable interrupt. In an example embodiment, the interrupt controllers 106, 116 may select a default processor 124, 128 from the target set identified by the destination field 308 based upon the load balancing value field 310 of the interrupt message 300 and a load balancing algorithm such as, for example, the first asserted bit search algorithm described above in regard to block 516 of FIG. 5 and illustrated in FIG. 6.

In block 720, each node controller 106, 116 may determine whether it is associated with the identified default processor based upon information stored in the task priority table in a manner similar to block 518 of FIG. 5. Assuming that the selected default processor is among the processors 128 associated with the node controller 116, the node controller 106 may determine to terminate processing of the interrupt in block 722, and the node controller 116 may identify in block 724 a node target processor set comprising zero or more processors 128 that may service the interrupt based upon its task priority table in a manner similar to block 522 of FIG. 5.

The node controller 116 in block 726 may select from the node target set, a processor 128 to service the interrupt in a manner similar to block 524 of FIG. 5. The node controller 116 in block 728 may update the destination field 308 of the interrupt message 300 with the identifier for the selected processor 128 and may provide in block 730 the processors 128 of the node 103 with the updated interrupt message 300. In response to receiving the interrupt message 300, the selected processor 128 may determine in block 732 to service the redirectable interrupt associated with the interrupt message 300 based upon the destination field 308 of the received interrupt message 300.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention

What is claimed is:

1. A system comprising
a processor set;
an I/O device to generate an interrupt;
an input/output (I/O) subsystem to generate an interrupt message comprising a load balancing value in response to the interrupt of the I/O device; and
a node controller to determine, based at least upon the load balancing value of the interrupt message, whether at least one processor of the processor set is to process the interrupt.

2. The system of claim 1, wherein the node controller causes at least one processor of the processor set to process the interrupt in response to determining that at least one processor of the plurality of processors is to process the interrupt.

3. The system of claim 1, further comprising
another processor set; and
another node controller to cause at least one processor of the another processor set to process the interrupt in response to determining based at least upon the load balancing value of the interrupt message that at least one processor of the another processor set is to process the interrupt.

4. The system of claim 1, wherein the I/O subsystem updates the load balancing value in response to receiving the interrupt.

5. The system of claim 1, wherein the I/O subsystem generates the interrupt message such that the interrupt message comprises a destination identifier that identifies processors suitable for processing the interrupt.

6. The system of claim 1, wherein
the I/O subsystem generates the interrupt message such that the interrupt message comprises a destination identifier that identifies processors suitable for processing the interrupt, and
the node controller identifies a default processor for the interrupt based upon the destination identifier and to cause at least one processor of the processor set to process the interrupt in response to determining that the processor set comprises the default processor.

7. A method comprising
generating an interrupt message comprising a load balancing value in response to an interrupt.

8. The method of claim 7, further comprising
updating the load balancing value in response to the interrupt.

9. The method of claim 7, further comprising
updating the load balancing value in accordance with a predetermined load balancing algorithm.

10. The method of claim 7, further comprising
updating the load balancing value in accordance with a wrap-around counter algorithm.

11. The method of claim 7, wherein generating further comprises
generating the interrupt message to further comprise a destination identifier that identifies one or more targets suitable for processing the interrupt.

12. The method of claim 7, further comprising
causing at least one processor of a processor set to process the interrupt in response to determining, based at least upon the load balancing value of the interrupt message, that at least one processor of the processor set is to process the interrupt.

13. The method of claim 7, further comprising
generating the interrupt message to further comprise a destination identifier that identifies one or more targets suitable for processing the interrupt;
identifying a default processor for the interrupt based at least upon the destination identifier and load balancing value; and
causing at least one processor of a processor set to process the interrupt in response to the processor set comprising the default processor.

14. The method of claim 7, further comprising
generating the interrupt message to further comprise a destination identifier that identifies one or more targets suitable for processing the interrupt;
identifying a default processor for the interrupt based at least upon the destination identifier and the load balancing value; and
selecting a lowest priority processor of the processor set to process the interrupt in response to the processor set comprising the default processor.

15. A method comprising
determining, based at least upon a load balancing value of an interrupt message, whether at least one processor of a processor set is to process an interrupt associated with the interrupt message.

16. The method of claim 15, further comprising
causing at least one processor of the processor set to process the interrupt in response to determining that at least one processor of the processor set is to process the interrupt.

17. The method of claim 15, further comprising
providing at least one processor of the processor set with an updated interrupt message comprising an identifier that identifies at least one processor of the processor set in response to determining that at least one processor of the processor set is to process the interrupt.

18. The method of claim 15, wherein determining further comprises
identifying a default processor for the interrupt based at least upon the load balancing value and a destination identifier of the interrupt message that identifies one or more processors suitable to process the interrupt; and
determining that at least one processor of the processor set is to process the interrupt in response to the processor set comprising the default processor.

19. The method of claim 15, wherein determining further comprises identifying a default processor for the interrupt based at least upon the load balancing value and a destination identifier of the interrupt message that identifies one or more processors suitable to process the interrupt, and the method further comprises
selecting a lowest priority processor of the processor set identified by the destination identifier to process the interrupt in response to the processor set comprising the default processor.

20. The method of claim 15, wherein determining further comprises
applying a first find algorithm to the destination identifier of the interrupt message to obtain a default processor for the interrupt, a starting position of the first find algorithm being based at least in part upon the load balancing value of the interrupt message, and
determining that at least one processor of the processor set is to process the interrupt in response to the processor set comprising the default processor.

21. The method of claim 15, wherein determining further comprises
applying a first find algorithm to a destination identifier of the interrupt message to obtain a default processor for the interrupt, a starting position of the first find algorithm being based at least in part upon the load balancing value of the interrupt message, and
selecting a lowest priority processor of the processor set identified by the destination identifier to process the interrupt in response to the processor set comprising the default processor.

22. A machine-readable medium, comprising a plurality of instructions, which in response to being executed, result in an interrupt controller
identifying a default processor to service an interrupt based at least upon a load balancing value and a destination identifier that identifies a target processor set to service the interrupt;

determining based upon the default processor whether a node processor set associated with the interrupt controller is to service the interrupt identifying a node target processor set comprising processors that are enabled for servicing interrupts, that are included in the target processor set and that are included in the node processor set; and selecting a processor to service the interrupt from the node target processor set in response to determining that the node processor set is to service the interrupt.

23. The machine-readable medium of claim 22, wherein the plurality of instructions, in response to being executed, further result in the interrupt controller providing the selected processor with an updated interrupt message comprising an identifier that identifies the selected processor to service the interrupt.

24. The machine-readable medium of claim 22, wherein the plurality of instructions, in response to being executed, further result in the interrupt controller selecting the processor from the node target processor set in response to determining that a task priority associated with the processor is lower than task priorities associated with the other processors of the node target processor set.

25. The machine-readable medium of claim 22, wherein the plurality of instructions, in response to being executed, further result in the interrupt controller selecting the processor from the node target processor set based at least upon a task priority associated with the processor.

26. The machine-readable medium of claim 22, wherein the plurality of instructions, in response to being executed, further result in the interrupt controller applying a first find algorithm to the destination identifier of the interrupt message to identify the default processor for the interrupt, a starting position of the first find algorithm being based at least in part upon the load balancing value of the interrupt message.

27. An interrupt controller comprising a plurality of storage elements, each storage element associated with an interrupt and storing a destination identifier identifying a target processor set to process the associated interrupt and a vector identifying an interrupt service routine to service the associated interrupt;

an interrupt manager to generate, in response to detecting an interrupt, an interrupt message comprising the destination identifier and the vector associated with the detected interrupt, and a load balancing value to help balance servicing of the detected interrupt among the target processor set identified by the destination identifier; and a load balancer to update the load balancing value in response to the detected interrupt.

28. The interrupt controller of claim 27, wherein the load balancer comprises a wrap-around counter that increments the load balancing value in response to each interrupt detected by the interrupt manager.

29. An interrupt controller, comprising a plurality of storage elements comprising a plurality of identifiers that identify processors of a node processor set associated with the interrupt controller; and an interrupt manager to receive a first interrupt message comprising a load balancing value and a destination identifier that identifies a target processor set to service an interrupt associated with the first interrupt message, and to provide the node processor set with a second interrupt message comprising an identifier selected from the plurality of storage elements based upon the load balancing value and the destination identifier, the identifier identifying a processor of the node processor set to service the interrupt associated with the first interrupt message.

30. The interrupt controller of claim 29, wherein the plurality of storage elements further comprise a plurality of priority values identifying priorities associated with processors of the node processor set, and the interrupt manager selects the identifier based further upon the priority values of the plurality of storage elements that are associated with the target processor set.

* * * * *